_United States Patent Office_

3,496,224
Patented Feb. 17, 1970

3,496,224
PURIFICATION OF SULFONIC ACIDS
George W. Ayers, Chicago, and William A. Krewer, Arlington Heights, Ill., assignors to Union Oil Company of California, Los Angeles, Calif., a corporation of California
No Drawing. Filed Sept. 13, 1966, Ser. No. 578,962
Int. Cl. C07c *139/14*
U.S. Cl. 260—505                           11 Claims

ABSTRACT OF THE DISCLOSURE

An aqueous sulfonate salt solution is purified of metallic cations and of sulfate ions by contacting the solution with a strongly acidic cation exchange resin. The sulfonate solution so purified is suitable as a hydrotrope in the detergent industry.

DESCRIPTION OF THE INVENTION

This invention relates to the preparation of organic sulfonic acids or sulfonates substantially free of contaminating sulfuric acid, sulfate or metal ions.

Sulfonic acids or sulfonates are conventionally prepared by sulfonation of hydrocarbons with sulfuric acid, fuming sulfuric acid or sulfur trioxide, followed by neutralization to form the salts if desired. Separation of the sulfonic acids from sulfuric acid is conventionally accomplished by addition of calcium oxide, hydroxide or carbonate to form the corresponding calcium salts, i.e., calcium sulfonate and calcium sulfate, followed by filtration to separate the calcium sulfate precipitate. Sulfonic acid salts, other than calcium, may then be prepared by treating the filtered solution with ammonium carbonate or the desired metal oxide, hydroxide or carbonate, filtering off calcium hydroxide or carbonate and concentrating or evaporating the resulting ammonium or desired metal sulfonate to dryness. However, sulfonates prepared by this procedure still contain undesirable, though relatively small, amounts of calcium sulfate. In particular, even the small amount of calcium sulfate remaining from this conventional procedure results in a sulfonate product that may not be suitable as a hydrotrope in the detergent industry.

It is accordingly an object of the present invention to prepare sulfonic acids or sulfonates that are sufficiently free from sulfuric acid, sulfate ion or metallic ion impurities, e.g., calcium sulfate, to be useful as hydrotropes.

According to the present invention it has been found that this objective may be achieved by means of a manufacturing process comprising the following steps: (1) sulfonation of a hydrocarbon with sulfuric acid, fuming sulfuric acid or sulfur trioxide, (2) dilution with water, (3) treatment of the resulting sulfonic acid solution with an oxide, hydroxide or carbonate of a metal whose sulfonate is water-soluble but whose sulfate is relatively insoluble, e.g., calcium, barium, strontium or lead, (4) filtration to remove most of any insoluble metal sulfate and (5) percolation of the filtered solution through a cation exchange resin that is wholly or partly in the acid form to remove the metal ion as well as substantially any remaining sulfuric acid or sulfate impurity. Step (4) may, however, be omitted in some instances where relatively little sulfuric acid is formed along with the sulfonic acid in the sulfonation reaction, e.g., where sulfur trioxide is used in vapor form as the sulfonating agent. The resulting aqueous pure sulfonic acid may be used as a chemical intermediate or finished product—any desired amount of water can be removed in vacuo, keeping the temperature as low as possible to prevent hydrolysis. The aqueous pure sulfonic acid may also be converted to any desired salt by addition of ammonia or suitable metal oxide, hydroxide or carbonate and concentration of the resulting aqueous solution, with subsequent crystallization of the pure sulfonate salt therefrom.

The essence of applicant's invention is the simultaneous removal of metal (such as calcium) and sulfuric acid (or sulfate ion) from a solution containing one or more sulfonates in a polar solvent, such as water, by contacting the solution with a bed of cation exchange resin. A cation exchange resin has often been used for removal of metal ions from solution, as for example in U.S. Patent 2,527,300. However, the removal of sulfuric acid or sulfate ion in the presence of metal ion, is entirely unexpected on the basis of prior art knowledge.

Separation of sulfonic and sulfuric acids by means of anion exchange resins is disclosed in U.S. Patent No. 3,030,411. The process of this patent is, however, limited to the use of oil-soluble sulfonic acids and to the use of non-polar solvents. Furthermore, substantially all of any polar solvent used in regeneration of the anion exchange resin must be removed from the resin after each regeneration.

Hydrocarbons that may be employed in the process of the present invention include any that can be sulfonated to give a sulfonic acid product that is soluble in a polar solvent. Those yielding water-soluble sulfonic acids and sulfonates are, however particularly suitable in the process of the invention. These include aliphatic, aromatic or naphthenic hydrocarbons, with aromatic or substituted-aromatic compounds being preferred. Substituents may include saturated aliphatic hydrocarbon radicals, e.g., of up to about 6 carbon atoms, or other radicals that do not interfere with solubility of the sulfonic acid products and do not react adversely with the sulfonation agent or with the cationic exchange resin. The process is particularly applicable to benzene derivatives containing one or more aliphatic hydrocarbon radicals of about 1 to 6 carbon atoms, e.g., toluene and xylene, as illustrated in the examples below. Higher molecular weight hydrocarbons whose sulfonic acid or sulfonate derivatives are oil-soluble may also be used if the sulfonic acid products are dissolved in a polar solvent such as alcohol, alcohol-ether or an ether such as dioxane and the resulting polar solution processed according to the process of the invention, more specifically described with reference to aqueous solutions. Such higher molecular weight hydrocarbons include the well known alkyl-aromatic compounds in which the alkyl group contains about 9 to 18 carbon atoms. These are described in above-mentioned Patent No. 3,030,411.

Sulfonation of hydrocarbons is conventional and may be accomplished by means of well known sulfonating agents, e.g., sulfuric acid, fuming sulfuric acid or sulfur trioxide in any of its forms including addition compounds. The reaction may also be carried out in either liquid or vapor states. The product may be a single sulfonic acid or a mixture of different sulfonic acids. Following sulfonation the reaction mixture is diluted with water, prior to neutralization. Optimum amounts of water will vary with the particular sulfonic acid, the neutralizing agent to be subsequently employed, temperature, etc. and are best determined empirically. This step in the process is also conventional and selection of optimum amounts of water will be obvious to one of ordinary skill in the art.

Following dilution, the sulfonic acid and any excess sulfuric acid are neutralized by addition of an oxide, hydroxide, or carbonate of a metal whose sulfonate is soluble but whose sulfate is relatively insoluble. Examples of such metals are calcium, barium, strontium and lead. Calcium compounds are, however, generally most efficient and economical and the neutralizing agent usually employed is lime (the process generally being referred to as "liming out"). The amount of neutralizing agent added should be at least sufficient to neutralize both the sulfonic and sulfuric acids; however, use of an excess is generally desirable to ensure complete neutralization.

The resulting mixture is then filtered, preferably while hot, to remove most of the relatively insoluble metal sulfate. Filtration may be accomplished by any conventional means such as use of a rotary vacuum filter. Usually it is most convenient to allow the mixture to settle, then filter the decanted liquid through cloth or a bed of sand.

The solution is then cooled and passed slowly, as by percolation, through a bed of cationic exchange resin that has been activated with dilute mineral acid to convert the resin at least in part, and preferably entirely, to the acid form. The resin may be any of a variety of conventional strongly acidic cationic exchange resins, particularly sulfonic resins. Examples of suitable resins are (1) sulfonic resins of the phenolic type prepared by reaction of phenol, an aldehyde and sulfonic acid or sulfite, (2) sulfonic resins prepared by sulfonation of polystyrene or copolymers of styrene and divinylbenzene and (3) carboxylic type resins prepared by incorporation of maleic anhydride into a styrene-divinylbenzene copolymer and hydrolysis of the resulting product. These resins are activated, and readily regenerated by passing hydrochloric acid therethrough until all or most of the metal ion is removed, then washing the water, which may be hot (less than about 175° F. to avoid decomposition of the resin), until the washings are free of chloride ion. Best results in regeneration are obtained with 5 to 20% hydrochloric acid solution. Too strong an acid solution lowers the life of the resin, while too weak an acid solution increases regeneration time.

The resin is employed in a conventional exchange column. Optimum dimensions of the column will vary with the type of resin, state of subdivision of the resin, desired rate of throughput of the sulfonic-sulfuric acid solution, efficiency of the resin, etc., and are best determined empirically. Physical structure of the column and state of subdivision of the resin will also vary with the above parameters and determination of optimum values is best accomplished by experiment. Determination of such values is within the purview of one skilled in the art.

The sulfonic acid solution resulting from the contacting with cationic exchange resin is essentially free of sulfuric acid or sulfate ion as well as from metal ion. Consequently, sulfonic acids or sulfonate salts of high purity can be prepared readily and economically by the present invention and can be used as spectroscopic standards, as intermediates for preparation of other compounds, as hydrotropes for use in the detergent industry and, in general, where compounds of high purity are desired.

Sulfonate salts are readily prepared from the sulfonic acids that result from the process of the invention by treatment with conventional neutralizing agents such as ammonia or a metal oxide, hydroxide or carbonate.

The invention will be more specifically illustrated by the following examples:

EXAMPLE I

Mixed sodium xylenesulfonates from the partial sulfonation of commercial zylene

Xylene (200 g.) was stirred for 6¼ hours with 400 g. of 96% sulfuric acid at 23–26° C. and the reaction mixture was poured into about 2 liters of distilled water. Upon standing, 71.8 g. of unreacted xylene separated and was removed. Hydrated lime was then added in excess to the stirred aqueous layer and the mixture was filtered while hot to remove precipitated calcium sulfate. The filtrate was heated on a steam bath until the volume was approximately 1 liter. It was then filtered hot to remove a small amount of suspended calcium sulfate. The calcium sulfonate solution was then cooled and passed slowly through a column of Dowex 50 cationic exchange resin (the sodium salt form of a sulfonated copolymer of styrene and divinylbenzene) which had been activated with dilute hydrochloric acid and washed until the washings were free of chloride ion. The sulfonic acid held up in the activated exchange resin was washed out with water and the washings were added to the material which had passed through the activated resin before the washing process. The combined clear solution contained the free sulfonic acids but contained no sulfuric acid or metal ions of any kind. The free acids were neutralized with sodium hydroxide solution and the solution evaporated to dryness on a steam bath. A total of 229.5 g. of solid product was obtained which contained, upon analysis, 87.6 weight percent sodium xylenesulfonates and 12.4 weight percent water. No trace of calcium sulfate was present. This product is suitable for use as a hydrotrope in the detergent industry.

EXAMPLE II

A similar experiment was carried out except that instead of using the cationic exchange resin, the filtered calcium sulfonate solution containing a small amount of calcium sulfate was treated with just enough sodium sulfate solution to precipitate the calcium as calcium sulfate. After the precipitated calcium sulfate had been filtered from the hot mixture, the filtrate was evaporated to dryness on a steam bath. The yield of product was 228.7 g. The product contained, upon analysis, 87.6 weight percent sodium xylenesulfonates, 1.1% metal sulfate and 11.3% water. Sufficient calcium sulfate was present in the final product to make it unsuitable for use as a hydrotrope by the synthetic detergent industry.

It is thus seen that modification of the process of Example II as carried out in Example I, using a cationic exchange resin, results in a product useful as a hydrotrope. Moreover, the ammonium or any soluble metal salt of the xylenesulfonic acids can be prepared by replacing the sodium hydroxide of Example I by the hydroxide or carbonate of the radical or metal desired without having the undesired calcium sulfate contaminant present in the final product. The process of Example I, moreover, avoids costly and troublesome recrystallization of the product, which may not always be successful in removing the trace of troublesome calcium sulfate. Appreciable fractionation of the xylensulfonate isomers (by fractional crystallization) is also not desirable from the standpoint of uniformity of the product.

EXAMPLE III

Potassium toluenesulfonate for use as a hydrotrope

During 30–40 minutes, 400 g. of 98% sulfuric acid was added to 276 g. of boiling toluene, with mechanical stirring. The mixture was stirred and refluxed a total of 1.5 hours (until no unreacted toluene remained). The sulfonation mixture was cooled by means of an ice bath, then incremental amounts of water and calcium hydroxide were added until the mixture had a pH of approximately 8. A total of approximately 800 cc. of water was added. The mixture was filtered at room temperature to remove most of the calcium sulfate. The calcium toluenesulfonate solution containing a small amount of calcium sulfate was passed through a bed of activated sulfonated styrene-divinylbenzene resin that had been activated by treatment with diluted hydrochloric acid. A solution was obtained which contained only toluenesulfonic acid, with no trace of calcium ion or sulfate ion present. After neutralization with potassium hydroxide solution, using phenolphthalein as outside indicator, the solution was evaporated on a steam bath. The product (280 g.), upon analysis, showed 92.8% potassium toluenesulfonate, 7.2% water, no sulfate and no trace of calcium salts. This product is suitable for use as a hydrotrope in the detergent industry.

EXAMPLE IV

A total of 367 g. of 20% fuming sulfuric acid was added over a period of one-half hour to 276 g. of mechanically-stirred toluene, during which period the temperature was gradually increased to the boiling point of the toluene. Further stirring of the refluxed mixture for one and one-half hours was sufficient to give a completely sulfonated product. The sulfonation mixture was cooled, then treated with increments of water and calcium hydroxide until the pH of the mixture was approximately 8. The mixture was then filtered to remove precipitated calcium sulfate. The clear filtrate was reacted with sodium sulfate solution until no more calcium sulfate was precipitated. The mixture was filtered and the clear solution was evaporated to dryness. The solid product contained by analysis 89 weight percent of sodium toluenesulfonate, 3.3 weight percent of sodium and calcium sulfates and 7.7% water. This product was not suitable for use as a hydrotrope because of the calcium sulfate impurity. Recrystallization of a portion of the product from water failed to remove all of the calcium sulfate impurity.

We claim:
1. A method for the treatment of aqueous solutions of hydrocarbonsulfonic acids or salts thereof, said solutions comprising a metal whose sulfonate is relatively water-soluble and whose sulfate is relatively water insoluble and comprising a minor amount of sulfate, comprising:
   subjecting said solution to an ion exchange treatment consisting essentially of contacting the aqueous solution with a strongly acidic cation exchange resin that has been activated by being placed at least partially in the acid form and recovering from said contacting a solution substantially free of said metal and sulfate ion.
2. The method of claim 1 in which the sulfonic acid is a benzene derivative containing aliphatic hydrocarbon radicals having 1 to 6 carbons.
3. The method of claim 1 in which the sulfonic acid is a xylenesulfonic acid.
4. The method of claim 1 in which the sulfonic acid is a toluenesulfonic acid.
5. The method of claim 1 in which said metal is calcium, barium, strontium or lead.
6. The method of claim 1 in which said metal is calcium.
7. The method in claim 1 in which the cationic exchange resin is a sulfonic acid type resin.
8. The method of claim 7 in which the resin is a sulfonated polystyrene resin.
9. The method of claim 7 in which the resin is a sulfonated styrene-divinylbenzene copolymer.
10. The method of claim 1 in which the resin is activated by treatment with mineral acid.
11. The method of claim 10 in which the mineral acid is hydrochloric acid.

References Cited

UNITED STATES PATENTS

| 1,564,239 | 12/1925 | Hillyer. |
| 2,463,677 | 3/1949 | Brandner. |
| 2,572,344 | 10/1951 | Jackson et al. |
| 2,615,924 | 10/1952 | Reents. |
| 2,775,621 | 12/1956 | MacLean et al. |
| 2,878,182 | 3/1959 | Bloch. |
| 2,897,238 | 7/1959 | Toppel. |
| 3,025,135 | 3/1962 | Kenworthy _____ 23—172 |
| 3,030,410 | 4/1962 | Woodbridge et al. |
| 3,030,411 | 4/1962 | Leum et al. |
| 3,252,897 | 5/1966 | Hesler et al. |

FOREIGN PATENTS

| 212,667 | 1/1957 | Australia. |

LEON ZITVER, Primary Examiner

J. E. EVANS, Assistant Examiner

U.S. Cl. X.R.

252—161; 260—435, 503, 513